J. DAVIDSON.
VALVE GEAR.
APPLICATION FILED JUNE 22, 1911.

1,008,121.

Patented Nov. 7, 1911.

Witnesses
N. L. Meem
G. M. Kaufman

Inventor.
John Davidson.
Per Mason Fenwick & Lawrence
Attorneys.

COLUMBIA PLANOGRAPH CO., WASHINGTON, D. C.

UNITED STATES PATENT OFFICE.

JOHN DAVIDSON, OF PENDLETON, ENGLAND.

VALVE-GEAR.

1,008,121.  Specification of Letters Patent.  Patented Nov. 7, 1911.

Application filed June 22, 1911.  Serial No. 634,821.

*To all whom it may concern:*

Be it known that I, JOHN DAVIDSON, a subject of the King of Great Britain, residing at Pendleton, in the county of Lancaster, Kingdom of Great Britain, have invented certain new and useful Improvements in and Connected with Valve-Gears, of which the following is a specification, reference being had therein to the accompanying drawing.

My invention relates to improvements in and connected with valve gears and has for its object to provide means suitable for operating piston and drop valves on engines running at any number of revolutions and whereby motion is transmitted from the cam of the valve gear to the valve spindle without subjecting the latter to side strain and friction is reduced to a minimum. I attain this object by the mechanism illustrated in the accompanying drawing, in which—

Figure 1:
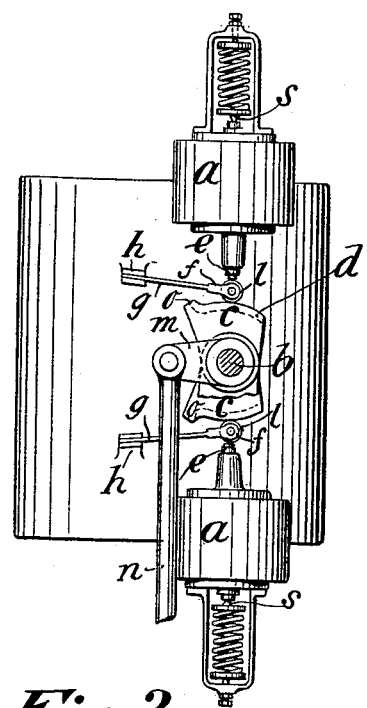
Figure 2:
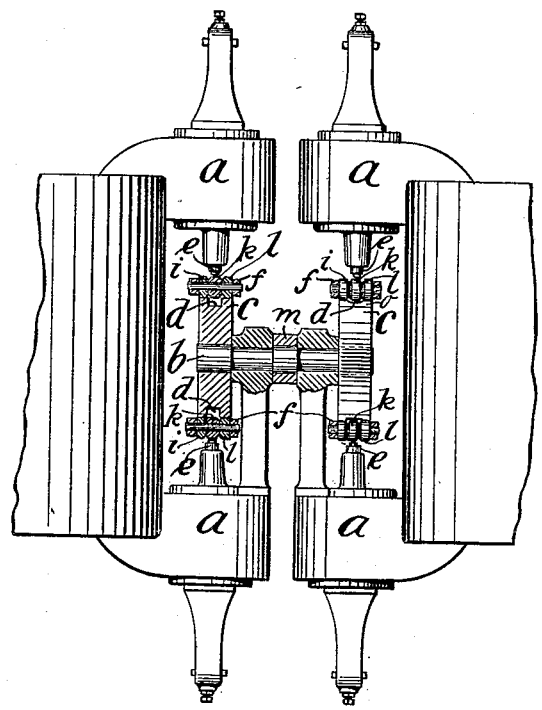
Figure 3:
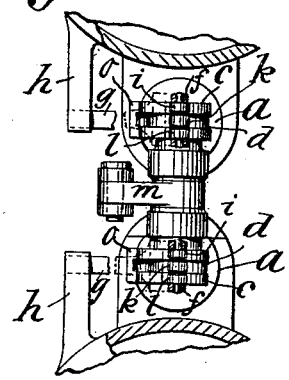
Figure 4:
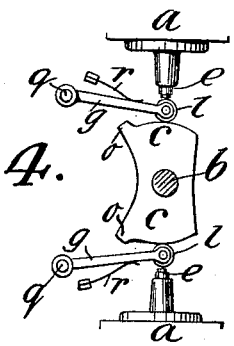

Figure 1 is a sectional side view, Fig. 2 a front view partly in section, and Fig. 3 a sectional plan of a valve gear constructed in accordance with my invention. Fig. 4 is a detached side view of a modification thereof.

Similar letters refer to similar parts throughout the several views.

In carrying out my invention and referring to Figs. 1, 2 and 3, which show the same applied to the four valves $a$ of a uniflow double acting two crank engine, I secure on a common shaft $b$ two cams $c$, each face of which has a peripheral groove $d$, and is so formed as to actuate two valve spindles $e$ at the same time. The valves $a$ are so arranged, that one cam $c$ comes between two valves $a$ and the spindles $e$ of the said valves face the peripheries of the cam $c$. Between each of the spindles $e$ and the cam $c$ is situated a fork $f$ arranged at one end of a flexible arm $g$ or the like, preferably made of spring steel, and secured at its other end in a bracket $h$. The fork $f$ carries three rollers $i, k, l$, the two outer ones $i, l$ of which, owing to the spring influence of the arm $g$, ride upon the periphery of the cam $c$ and the center one $k$ rides over the groove $d$ on the cam $c$ and has directly above it one of the spindles $e$ of the valves $a$. On the common shaft $b$ is secured an arm $m$. The arm $m$ is pivotally connected to an arm $n$ which is actuated by the crank shaft of the engine by an eccentric or from a counter shaft (not shown).

Each of the cams $c$ is so formed, that when the valves $a$ are closed the center rollers $k$ are out of contact with the spindles $e$ of the valves $a$ and when the cam $c$ is moved to open the valves $a$ the center rollers $k$ are gradually raised until the same come in contact with the valve spindles $e$, whereupon the valves are quickly opened by the projection $o$ on the cam $c$.

In lieu of the flexible arm $g$ or the like, I may employ a rigid arm $g$ or the like, see Fig. 4, oscillatably mounted at $q$ and preferably under the influence of a spring $r$.

I preferably form the valves $a$ with their springs outside the valve boxes and pressing on the center point $s$ of the valve spindle $e$ which extends through the back of the valve box for this purpose. This construction of valve leaves the valve proper free to revolve on its seat and at the same time obviates any deterioration of the spring due to the high temperature of the steam or the like.

The shape of the projection $o$ is determined by the amount of lift of the valve required and the speed at which it is desired to open and close the same.

The operation of the above described valve gear, which is especially applicable to engines having a high number of revolutions, is as follows:—When the mechanism commences its movement which opens the valves, the arm $m$ is in its central position and the rollers $k$ are out of contact with the valve spindles $e$, in order to allow the valve to seat itself properly. As the arm $m$ ascends or descends the cams $c$ are turned thus bringing the rollers $k$ gradually into contact with the valve spindles $e$ thus obviating any noise which otherwise would be caused by the rollers coming suddenly into contact with the valve spindles. From this point the cams $c$ lift the rollers $k$ at an increased speed which rollers $k$ lift the valve spindles $e$ and thus open the valves $a$, until the arm $m$ has attained its highest or lowest position. The movement of the same is then reversed which allows the valves $a$ to again close and become truly seated, when the operation is again repeated.

From the above it will be seen that all gear which is subjected to rapid movement is reduced to a minimum, and the arrangement of the rollers $i$, $k$, $l$ also reduces friction to a minimum.

I claim:

1. In a valve gear for engines, two valves arranged with their spindles facing and in alinement with each other an oscillating cam between the said spindles having two faces diametrically opposite each other with a groove in each, an arm secured between each of the said faces and the said valve spindles, and three rollers mounted on the free end of each of the said arms, the two outer rollers riding upon the said cam face and the middle roller over the said groove and transmitting motion from the said cam face to the said spindles, all combined substantially as and for the purpose set forth.

2. In a valve gear for engines, two valves arranged with their spindles facing and in alinement with each other, an oscillating cam between the said spindles having two faces diametrically opposite each other each comprising a gradually rising part, a projection and a groove dividing the cam face into two longitudinal halves, a spring influenced arm secured between each of the said faces and the said spindles and three rollers mounted on a common stud on the free end of each of the said arms, the two outer rollers riding upon the said cam face to actuate the said arm and the middle roller riding over the said groove causing the said arm to impart motion to the said valve spindles, substantially as and for the purpose set forth.

3. In a valve gear for double acting engines, two pairs of valves arranged side by side with spindles of each pair facing and in alinement with each other, an oscillating cam between each pair of valves spindles secured upon a common stud and having each two faces diametrically opposite each other with a groove in each, an arm secured between each of the said faces and the said pairs of valve spindles, three rollers mounted on the free end of each of the said arms, the two outer rollers riding upon the said cam face and the middle roller over the said groove and transmitting motion from the said cam to the said valve spindles, all combined substantially as and for the purpose set forth.

In testimony whereof I have affixed my signature in presence of two witnesses.

JOHN DAVIDSON.

Witnesses:
FERDINAND B. BOSSHARDT,
STANLEY E. BRAMALL.

---

Copies of this patent may be obtained for five cents each, by addressing the "Commissioner of Patents, Washington, D. C."